United States Patent [19]

Sogge

[11] Patent Number: 4,712,340
[45] Date of Patent: Dec. 15, 1987

[54] DECKING SUPPORT MEANS

[75] Inventor: John Sogge, Orlando, Fla.

[73] Assignee: FMC Corporation, Chicago, Ill.

[21] Appl. No.: 909,796

[22] Filed: Sep. 22, 1986

[51] Int. Cl.⁴ .......................... B44D 5/08; E04C 2/42
[52] U.S. Cl. ....................................... 52/177; 52/180; 52/664; 52/669
[58] Field of Search .................. 52/177, 180, 664, 669

[56] References Cited

U.S. PATENT DOCUMENTS

| | | | |
|---|---|---|---|
| 2,275,109 | 3/1942 | McGee | 52/696 X |
| 3,276,802 | 10/1966 | O'Brien | 52/664 X |
| 3,313,071 | 4/1967 | Johnston et al. | 52/177 |
| 4,198,795 | 4/1980 | Barnidge | 52/180 |

FOREIGN PATENT DOCUMENTS

| | | | |
|---|---|---|---|
| 2461006 | 7/1976 | Fed. Rep. of Germany | 52/180 |
| 1191536 | 4/1959 | France | 52/664 |

Primary Examiner—Alfred C. Perham
Attorney, Agent, or Firm—Douglas W. Rudy; Richard B. Megley

[57] ABSTRACT

A floor system is provided to bridge between spaced apart frame members while providing ready access to the area covered by the floor system. An interlocking arrangement of removable components is used with major transverse floor elements having a modified channel section that interlocks with receiving extensions of anchored floor plates.

11 Claims, 1 Drawing Figure

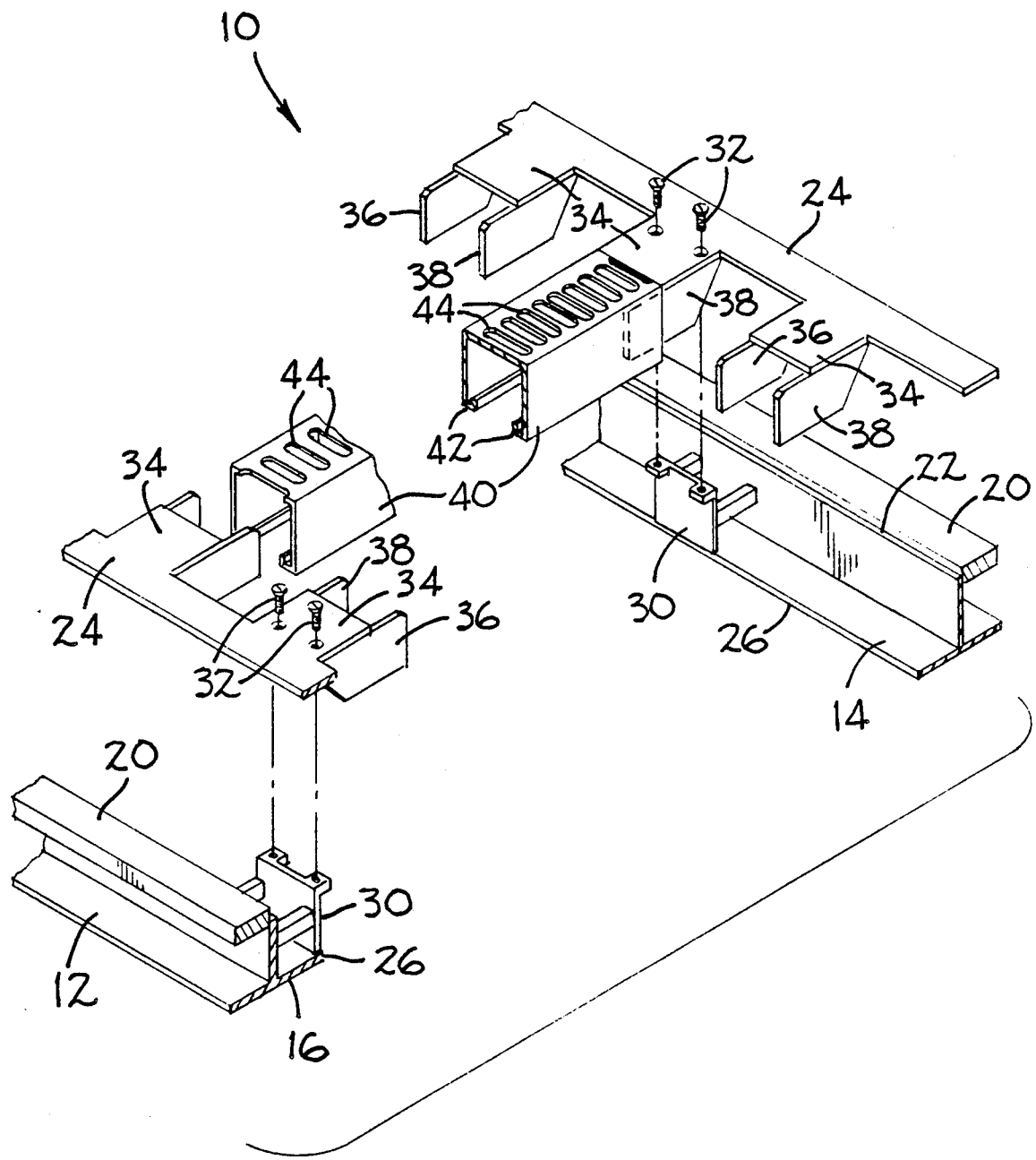

DECKING SUPPORT MEANS

A floor decking system is provided for use in aircraft loaders where a substantial portion of the deck is made up of rollers or other movable elements.

Floor or deck surface systems for use on equipment for servicing aircraft, especially for use in aircraft loaders has typically been conventional deck plate having a raised diamond pattern to provide same degree of tractive surface. This type of surface has several drawbacks including the difficulty encountered due to its use when access is necessary to the chamber below the floor. It also is a costly installation and inefficient use of materials when the floor plate has to be perforated to allow, for instance, the protrusion of rollers through the floor plate.

An improved flooring or deck surface is provided herein that will be more fully described hereinafter and will be readily understood after a perusal of the drawing FIGURE and an understanding of this disclosure.

The sole FIGURE necessary to communicate the invention is a section of a floor assembly taken from an aircraft loader that would normally have a plurality of roller deck surfaces on the upper surfaces thereof to handle and transport cargo containers, skids and the like.

The deck surface is shown in a partially disassembled orthographic projection of a portion of a full floor assembly generally 10 that includes left 12 and right 14 side frame members which may be "I-beams", channel-section beams, box beams or other similar configurations of beams. Shown as a preferred embodiment is a flanged beam 16 having an appended structural guard 20 which may be welded or suitably fastened to the upwardly directed plate of the beam 16. By attaching the structural guard to the outside of the plate of the beam 16 as shown, an edge support means such as 22 can be formed to accommodate the edge of a first floor means or anchored floor plate 24. The inboard flanges such as 26 of the beams 16 are provided with fastener attachment elements 30 which are suitably attached to the beams and to which the anchored floor plates 24 can be attached by means of the fasteners such as 32.

The anchored floor plates 24 are generally elongate elements that extend along the beams 16 and have horizontal tabs 34 extending inboard toward the opposite anchored floor plate. Fastened to the horizontal tabs, either by welding, other attachment means or by being folded over portions of the horizontal tabs, are projection means or receiving extensions 36 and 38. The receiving extensions extend out beyond the horizontal tabs 34 toward the other anchored floor plate 34 and are generally vertical with respect to the anchored floor plate 24.

The major transverse floor elements 40 are generally inverted "U" section elements with inwardly extending or directed flanges such as 42. The interior width of the major transverse floor elements from a left side interior wall to a right side interior wall is optimized to be similar in the outside-wall-to-outside-wall dimension of a pair of receiving extensions carried by a horizontal tab 34. The receiving extensions on both sides of the area to be floored over are positioned into the ends of the major transverse floor elements and the assembly, including floor elements such as 40, and the pair of anchored floor plates 24 are there fastened to the fastener attachment elements 30 to hold the major transverse floor elements in position. In order to prevent the floor elements from being lifted upwardly they may be provided with the aforementioned inwardly directed flanges that would abut the lower edges of the receiving extensions 36. The bottom surface of the uppermost side of the floor elements contacts the top edges of the receiving extensions. The same surface may be equipped with traction improving means such as items 44 shown in the FIGURE.

Thus it can be seen that an improved floor surface has been provided that can be effectively used in instances where an interrupted deck surface is desireable. Certain nuances of design are contemplated by the inventor and the following claims are to be liberally construed to cover such design nuances.

What is claimed is:

1. A floor system having a first floor means including a pair of projection means extending outwardly and downwardly from the bottom surface of said first floor means and beyond the top surface of said first floor means;
   a second floor means carried on said projection means of said first floor means in a free floating engagement, said second floor means having sidewall portions extending downwardly from a top surface of said second floor means whereby said sidewalls are positioned outboard of said projection means and the bottom surface of said second floor means is in contact with said projection means.

2. The invention in accordance with claim 1, wherein the improvement comprises a pair of first floor means each having a pair of projection means, one of each of said pair of first floor means supporting one of each of an end of said second floor means.

3. The invention in accordance with claim 2, wherein said second floor means is an elongated structure having a top deck surface, a left side wall extending downwardly from said top deck surface, a right side wall extending downwardly from said top deck surface whereby each of said side walls will be positioned outboard and adjacent said projection means and said top deck surface will be supported from its bottom surface on said projection means.

4. The invention in accordance with claim 3 wherein said second floor means, having said left and right sidewall portions further includes inwardly directed flanges extending inboard from said sidewall portions sufficient distance to extend inboard of said projection means of said first floor means.

5. A floor system comprising:
   a pair of first floor means each having a pair of projection means extending outwardly and downwardly from the bottom surface of said first floor means and extending beyond the top surface of said first floor means;
   a second floor means carried on said projection means, said second floor means being an elongated structure having a top deck surface, a left sidewall extending downwardly from said top deck surface, said left and right sidewalls further including inwardly directed flanges extending inboard from said sidewall portions sufficient distance to extend inboard of said projection means, one of each of said pair of first floor means supporting one of each of an end of said second floor means.

6. The invention in accordance with claim 5 wherein a pair of said first floor means are spaced apart from each other with said projection means directed toward each other and said second floor means is carried on said projection means of each of said first floor means.

7. In a floor system the improvement comprising:
a first floor means having an upper surface and a lower surface and an inner edge of said first floor means;
projection means attached to and projecting from the lower surface of said first floor means outwardly from said inner edge of said first floor means;
a second floor means having an upper surface, a left side vertical wall, a right side vertical wall, said left and right side walls each attached at a top end thereof to the said upper surface and said left and right side walls each having an inwardly directed lower flange, said second floor means carried on said projection means of said first floor means with said projection means adjacent respective said left and right side walls above said inwardly directed lower flanges.

8. The invention in accordance with claim 7 wherein a pair of first floor means are provided, each of said pair of first floor means are provided, each of said pair of first floor means having said projections directed inwardly toward the projections on said other of said pair of first floor means.

9. The invention in accordance with claim 8 wherein said second floor means is supported on a first end thereof by one of said pair of said first floor means and at a second end thereof by the other of said pair of first floor means.

10. The invention in accordance with claim 9 wherein said second floor means has an upper surface substantially the same width as the distance between said projections on said first floor means.

11. The invention in accordance with claim 10 wherein said projections have a height substantially the same as the height of said sidewalls of said second floor means between said flange and the bottom of said second floor means.

* * * * *